United States Patent [19]
Nierode et al.

[11] 3,934,651
[45] Jan. 27, 1976

[54] METHOD OF ACIDIZING SUBTERRANEAN FORMATIONS

[75] Inventors: Dale E. Nierode; Donald M. Kehn; Keith F. Kruk, all of Houston, Tex.

[73] Assignee: Exxon Production Research Company, Houston, Tex.

[22] Filed: Oct. 10, 1974

[21] Appl. No.: 513,807

[52] U.S. Cl. ............... 166/282; 166/283; 166/307; 166/308
[51] Int. Cl.² .................. E21B 43/26; E21B 43/27
[58] Field of Search .......... 166/282, 283, 307, 308; 252/8.55 C

[56] References Cited
UNITED STATES PATENTS

| | | |
|---|---|---|
| 2,891,619 | 6/1959 | Sneary .......................... 166/282 X |
| 3,153,450 | 10/1964 | Foster et al. ............... 252/8.55 R X |
| 3,252,904 | 5/1966 | Carpenter ......................... 166/283 |
| 3,319,716 | 5/1967 | Dill .................................. 166/282 |
| 3,434,971 | 3/1969 | Atkins ........................... 252/8.55 C |
| 3,710,865 | 1/1973 | Kiel ............................... 166/283 X |
| 3,757,863 | 9/1973 | Clampitt et al. .................. 166/307 |
| 3,760,881 | 9/1973 | Kiel .................................. 166/308 |
| 3,781,203 | 12/1973 | Clark et al. .................... 166/307 X |
| 3,791,446 | 2/1974 | Tate .................................. 166/307 |
| 3,799,266 | 3/1974 | Kiel ............................... 166/307 X |

*Primary Examiner*—Stephen J. Novosad
*Attorney, Agent, or Firm*—Robert L. Graham

[57] ABSTRACT

A subterranean formation is treated by injecting into the formation an aqueous acid solution comprising a water soluble vinyl compound (preferably polyvinyl alcohol or polyvinylpyrrolidone), a natural gum (preferably guar gum or gum karaya) and finely divided particulate material (preferably silica sand).

11 Claims, 1 Drawing Figure

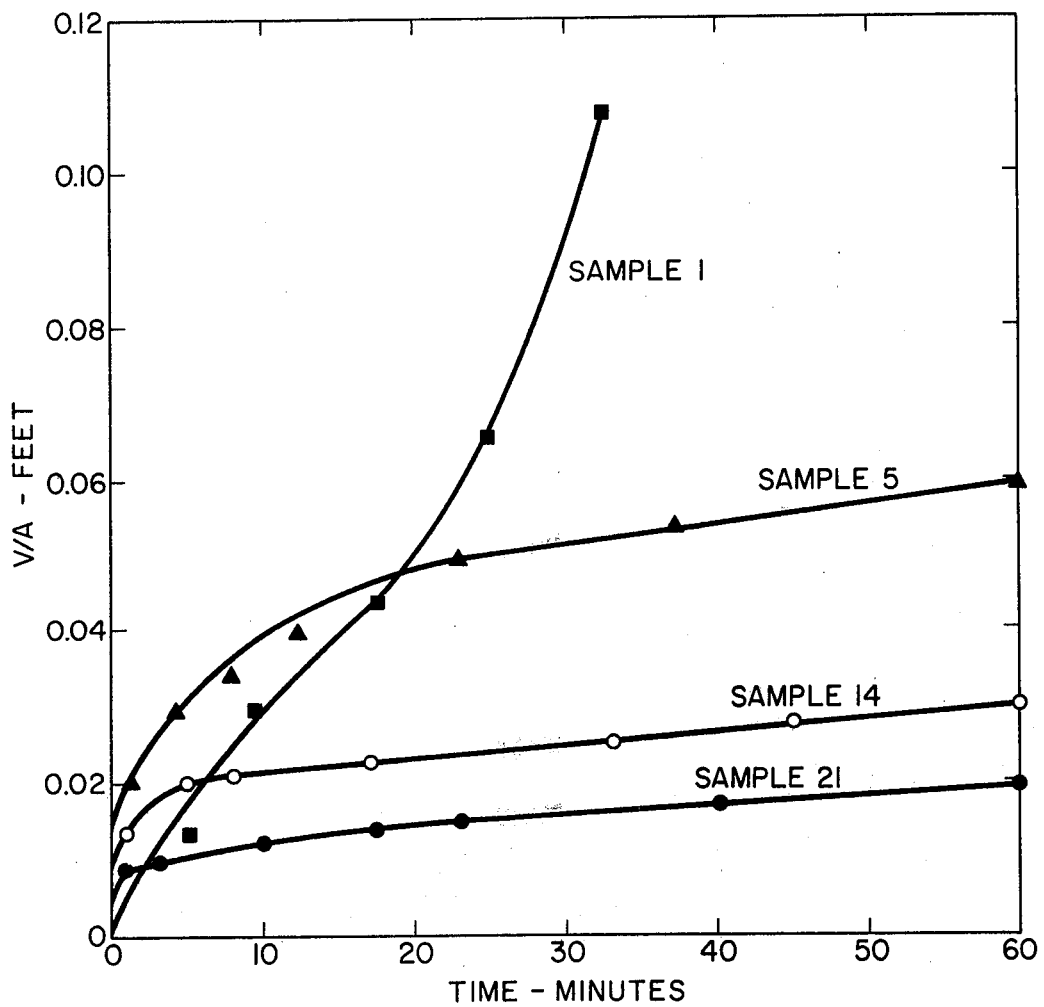

METHOD OF ACIDIZING SUBTERRANEAN FORMATIONS

BACKGROUND OF THE INVENTION

1. Field of the Invention

This invention relates to acidizing of subterranean formations surrounding oil wells, gas wells and similar boreholes. In one aspect, it relates to an improved fluid loss composition for use in acid fracturing.

2. Description of the Prior Art

Acid fracturing is a widely used technique for stimulating the production of subterranean carbonate formations surrounding oil wells, gas wells, and similar boreholes. Carbonate formations include limestones, dolomites or other reservoir rocks that contain substantial amounts of calcareous material. Acid fracturing of these formations normally involves the injection of an aqueous acid solution into the wellbore at a rate and pressure sufficiently high to fracture the surrounding formation. Stimulation is achieved by the acid etching the fracture walls, thereby providing highly conductive channels when the fracture closes. Tests have shown that the degree of stimulation afforded by acid fracturing is strongly dependent upon the extent of acid penetration in the fracture. One technique for providing deep acid penetration involves the use of gelled acids. The high viscosity of the gelled acid retards the rate of acid transport to the reaction site at the fracture wall and thus permits unspent acid to penetrate deeply into the fracture. Use of finely divided fluid loss additives have also been proposed to reduce the rate of acid transport to the reaction site. These finely divided materials retard fluid leakoff into the formation by building up a filter cake on the fracture wall. Laboratory tests, however, have shown that the effectiveness of most commercial fluid loss additives in attaining deeper acid penetration is only marginal. The reason for the poor performance of these materials is believed to be due to the tendency of the acid to quickly form wormholes in the fracture wall and thereby eliminate the effect of the filter cake provided by the fluid loss particles.

SUMMARY OF THE INVENTION

The present invention provides an improved acidizing process for treating subterranean, calcareous formations. The method employs an aqueous acid solution containing three components: (1) a vinyl polymer, (2) a natural gum, and (3) finely divided particles. Laboratory tests have shown that these three components combine synergistically to produce surprisingly deep acid penetration. The reasons for the improved results are not fully understood but are believed to be due in part to coaction of the vinyl polymer and natural gum in the presence of the finely divided particles to provide an effective fluid loss composition for the acid.

The preferred vinyl polymers include polyvinyl alcohol and polyvinylpyrrolidone as well as copolymers or derivatives of such materials. The natural gum usable in the present invention include gum arabic, guar, tragacanth, karaya, ghatti, or other natural occuring complex polysaccharide polymers. The preferred gums include guar and karaya. The finely divided component of the system may consist of silica sand or other particulate material having a sufficiently small particle size to effectively serve as a fluid loss additive. The particles should be inert to the aqueous acid solution and should have a particle size distribution such that the majority of the particles pass a 200 mesh screen (74 microns).

The concentration of each component in the aqueous acid solution may vary within broad ranges depending upon the properties of the formation being treated, type of treatment, and type of acid employed. Generally, for acid fracturing, the polymer concentration should be sufficient to provide the acid solution with a viscosity of at least 10 centipoises. Tests indicate that the preferred polymer concentration ranges from about 1.0 to about 5.0 weight percent of the acid solution with the natural gums constituting at least 25 weight percent of the polymer. The gum and finely divided particles provide additional fluid loss control by building up a filter cake on the formation wall. For best results, the gum should be present in a concentration of at least 0.5 weight percent of the treating fluid. The concentration of the silica sand should preferably be at least 2 pounds per barrel of treating fluid.

Although the three components may be used in any acid solution, the preferred system is an acid external emulsion containing from about 50 to about 80 volume percent of an internal oil phase and from about 20 to about 50 volume percent of an aqueous acid solution as the external phase. It has been found that the high concentration of the internal oil phase contributes to emulsion viscosity and that this system, when containing a vinyl polymer, a natural gum, and finely divided particles exhibits a low leakoff rate.

The acid emulsion containing the three component fluid loss composition may be used alone as the sole treating agent, or it may be used with other fluids. A treatment that has been quite successful in acid fracturing involves the injection of an oil-in-water emulsion to create and generate a fracture in the formation followed with the acid external emulsion.

Although any organic or mineral acid presently used in formation acidizing may be employed in the present invention, it is preferred that HCl solutions be used. The concentration of the aqueous HCl solution may be between about 3 and 37 volume percent with concentrations in the 15 to 28 volume percent being preferred.

DESCRIPTION OF THE DRAWING

The drawing is a plot comparing the fluid loss characteristics of several acid systems.

DESCRIPTION OF THE PREFERRED EMBODIMENTS

The main objective of acid fracturing of subterranean formations is to stimulate well productivity or injectivity. The treatment is normally designed to provide deep penetration of live acid into the formation to gain maximum stimulation. Although several factors effect the extent of acid penetration, such as fluid viscosity, rate of injection, acid reactivity, etc., laboratory tests indicate that the limiting factor is the fluid loss characteristic of the acid solution. If the acid solution leaks off into the formation rapidly, the acid will be spent within a few feet of the wellbore. On the other hand, if leak-off rate can be controlled to prevent excessive loss of fluid within the fracture, it is possible to inject the acid at a rate sufficient to deliver the unspent acid several hundred feet from the wellbore.

In accordance with the present invention, it has been found that excellent fluid loss control for acid solutions can be obtained using a three-component composition: (1) a water-soluble vinyl polymer, (2) a natural gum, and (3) finely divided particulate material.

The preferred vinyl polymer usable in the present invention is a water-soluble polymer capable of gelling aqueous acid solutions. Included in the class of materials are polymers, copolymers and derivatives of vinyl alcohol and vinylpyrrolidone.

The polymer of vinyl alcohol is available commercially in a variety of grades ranging from the high molecular weight, fully hydrolyzed grades to low molecular weight partially hydrolyzed grades. The polymer is normally made by first polymerizing vinyl acetate followed by the alcoholysis of polyvinyl acetate to polyvinyl alcohol. The degree of alcoholysis and the molecular weight determine the properties of the final product. The terms "fully hydrolyzed" and "partially hydrolyzed" denote the degree of substitution of the hydroxyl groups for acetyl groups along the polymer chain. Commercially the fully hydrolyzed grades are available at alcoholyzed levels of 98 to 100 percent and the partially hydrolyzed grades at levels of 87 to 89 percent. Although the partially hydrolyzed grades provide slightly more viscosity in aqueous solutions, all hydrolyzed grades appear to be useful in the present invention. Normally, the molecular weight of the polyvinyl alcohols capable of gelling aqueous acids fall in the 120,000 to 300,000 range. For the present invention, the high molecular weight grades (above about 170,000) are preferred.

In lieu of polyvinyl alcohol, polyvinylpyrrolidone (PVP), copolymers or derivatives thereof may be employed to thicken the aqueous acid solution. Various grades of this material are effective acid viscosifiers. PVP made from normal vinyl-2-pyrrolidone has the following general formula:

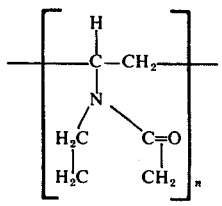

PVP is commercially available in several viscosity grades. Although all viscosity grades may be used to gell the acid solutions, the high viscosity grades are preferred.

Copolymers of vinylpyrrolidone and other derivatives thereof may also be used in the present invention. Such materials include alkylated polymers of vinylpyrrolidone and quaternized polymers of vinylpyrrolidone.

The natural gum usable in the present invention include the plant mucilages and are generally derived from plant materials which are dispersable in aqueous acid solutions to produce viscous solutions. The preferred natural gums include plant exudates such as arabic, tragacanth, karaya and ghatti and seed or wheat gum such as locust bean, guar, and the like. Guar gum and gum karaya, because of their availability and low cost, are preferred for use in the present invention.

The finely divided particulate material may be provided by finely ground silica sand, commonly referred to as silica flour. This material has a particle size distribution such that the majority of the particles pass 200 mesh screen and most of the particles are between 200 mesh and 325 mesh. A commercially available silica flour has the following particle size distribution:

| Mesh Size U.S. Sieve Series | Weight Percent Retained |
|---|---|
| 100 | 3.2 |
| 200 | 3.7 |
| 270 | 45.7 |
| 325 | 26.2 |
| pan | 21.2 |

In acid emulsions, the concentration of the polymers (e.g. vinyl compound and natural gum) should be sufficient to provide the aqueous acid phase with a viscosity of at least 10 centipoises at 70°F. This normally will require from 1.0 to 5.0 weight percent of polymer. In straight acid solutions, the concentration of the polymer mixture in the acid should be somewhat higher. In either system, the vinyl polymer and natural gum normally will be used in a weight ratio of about 1:1 to about 3:1.

The concentration of the finely divided silica sand will depend on the permeability of the formation to be treated but normally will be between about 2 pounds per barrel and 10 pounds per barrel of treating fluid.

As mentioned previously, almost any organic or mineral acid may be employed in the method of the invention. Such acids include acetic, formic, propionic, hydrofluoric, hydrochloric or mixtures of these acids. The preferred acid is an aqueous solution containing from 3 weight percent to 37 weight percent HCl. HCl, of course, is used primarily in acidizing limestone or other calcareous formations. In acidizing siliceous formations, a mixture of HCL and HF, known as mud acid may be employed.

In addition to the materials mentioned above, fracturing fluid may also contain corrosion inhibitors, deemulsifiers, friction reducers and the like.

In carrying out the method of the present invention, the procedure for injecting the acid solution into the formation will depend upon the type of treatment contemplated.

In many treatments, injection of the gelled acid alone into the formation will result in well stimulation. For example, in formations that have been damaged by drilling or completion fluid, productivity can sometimes be increased by injecting the gelled acid into the formation at either matrix or fracturing pressures. The retarded acid penetrates through the damaged zone and provides conductive channels in the form of etched fracture walls (e.g. acid fracturing) or wormholes (e.g. matrix acidizing).

In other treatments, it may be desirable to initiate and propagate a fracture with a viscous fracturing fluid (commonly referred to as a "pad") and follow this fluid with a gelled acid. In such operations, the gelled acid penetrates through the viscous fracturing fluid and etches the fracture walls. If the treatment is successful, the etches extend deep into the formation and provide highly conductive channels when the fracture closes. An effective pad fluid for initiating the fracture is an oil-in-water emulsion wherein the external water phase gelled with a polymeric thickening agent constitutes from 20 to 50 volume percent of the emulsion and the internal oil phase (e.g. crude oil condensate, diesel oil) constitutes the balance.

In still other treatments, it may be desirable to employ the viscous acid solution as the pad fluid for initiating and propagating the fracture and following this fluid with a concentrated acid solution. In this type of treatment, it is preferred to use as the fracturing fluid an oil-in-acid emulsion wherein the external acid solution contains the polymers and the emulsion has the finely divided sand suspended therein. The concentration of the internal oil phase will normally be between 50 and 80 volume percent. The viscosities of the pad emulsion and trailing acid should be controlled to provide a viscosity ratio at least 10:1. The high viscosity ratio enables the trailing acid to bypass or finger through the viscous pad fluid and penetrate deeply into the formation. The pad fluid normally has a high viscosity (e.g. from 100 to 500 centipoises at formation temperature) for generating a fracture of the desired geometry. In order to enhance the fingering of the mechanism, the trailing acid solution is normally used in ungelled form. However, in treatments where it is desired to retard the trailing acid the acid solution may also be gelled.

As indicated above, the fracturing treatment is normally designed to provide maximum acid penetration. With the aid of computer programs, optimum fluid properties, injection rates and volumes for a particular treatment can be determined. As a general rule, the injection of the pad is sufficient to provide a fracture of at least 100 feet and preferably from 200 to 300 feet. The injection of the trailing acid is normally at maximum permissible rate. The ratio of pad volume to acid volume may vary with wide limits but normally will be between about 0.5:1 and 2:1.

The preparation and injection of either the water-external or the acid-external emulsion may be performed "on-the-run". In this type of operation, the water phase of the emulsion is prepared by adding certain components such as the vinyl compound, emulsifier and corrosion inhibitor to the aqueous acid solution contained in suitable tanks. The blending equipment may be employed to disperse the additives by circulating from the tank through the equipment and back to the tank. The acid solution is then pumped through the blending equipment where oil is blended into the water forming an acid-external emulsion. The natural gum and silica sand, either as a dry blend or separately, are then blended into the emulsions at the desired concentrations.

In lieu of pumping the fluids "on-the-run", the fluids may be prepared at the surface prior to commencing pumping operations. In this type of treatment, the gelled aqueous acid phase is circulated through the blending equipment and mixed with the oil and returned to suitable storage tanks. With the fluids prepared, the pumping operations may commence.

In either type of treatment, injection operations are generally the same. Following pressure testing of the equipment, a small volume of water is normally pumped into the formation to establish injection. The injection of the pad fluid is normally pumped at maximum possible rates, usually from 5 to 50 BPM. Following the pad fluid, the acid containing fluid is injected into the formation, also at maximum permissible rates. The well is then shut-in permitting the formation to close. The etched walls resulting from the acid reaction with formation materials provide highly conductive channels within the formation after the fracture closes. As indicated previously, the degree of stimulation is a function of the length and conductivity of the etched channels.

LABORATORY EXPERIMENTS

In determining fluid loss characteristic of various fluids, flow tests were performed in Indiana limestone cores ranging in permeability from 0.1 to 60 millidarcies and in length from 3 to 27 inches. Each core was initially saturated with brine and the permeability ($K$) to brine was measured at 70°F. The system was then heated to the desired test temperature. The tests involved injecting the acid solution or acid emulsion into the cores and measuring the volume versus time for flow at a constant pressure differential. Each experiment was terminated at 60 minutes if breakthrough had not occurred by that time. Breakthrough occurs when a wormhole is formed through the length of the core.

Typically, the plotted fluid loss data for each test exhibited three flow characteristics: (1) an initial steep rise at early times indicating the build-up of filter cake on the face of the core, (2) a decline in the slope of the curve indicating that the particulate material is effectively retarding leakoff into the pores of the core, and (3) a straight line curve indicating a steady state condition. Under steady state conditions, the leakoff rate is a function of the quality and thickness of the filter cake and can be expressed by the following equation $$V = (\Delta P)/[\mu(L/K)]$$

where $V$ is the steady state leak-off velocity $\Delta P$ is the total pressure differential across the filter cake, $\mu$ is the viscosity of the fracturing fluid, and $(L/K)$ is the ratio of thickness to permeability of the filter cake.

From the above equation, it can be seen that the fluid should have high values of $\mu(L/K)$ for adequate fluid loss control. The fluid loss additives ideally provide high $L$ values and low $K$ values.

As indicated above, the fluid loss control additive does not exercise full control of the leak-off rate until the steady state filter cake has been formed. The volume of fluid leak-off into the formation matrix prior to attainment of the steady state condition is referred to in the art as "spurt volume". An important function of the fluid loss control additive is to reduce the spurt volume to a low value so as to permit more efficient application of the fluid injected into the formation.

The tests were performed using acid external emulsions. Each emulsion sample was prepared by blending No. 2 diesel (2 cp) into a 28% HCl solution containing the vinyl polymer and guar gum and a cationic surfactant. The silica sand was then blended into the emulsion. In some tests, brine was injected into the core ahead of the acid emulsion. In other tests a water external emulsion was used. The water external emulsion was 67 vol % No. 2 diesel, 33 vol % brine gelled with one wt % guar gum. The emulsifier was a cationic surfactant.

Each test was conducted for 60 minutes unless prior breakthrough occurred. The flow tests on samples 1 and 2 were performed at 70°F and all other tests at 200°F.

The fluid loss additive used in samples 2–8 and 11 was PVA and a commercially available material sold as Adomite Aqua. This material is finely divided particles coated with about 10 wt % of guar gum. The results of the tests are summarized in Table I.

Three characteristics tabulated in Table I relate to fluid loss behavior of the fluid samples. "Breakthrough" data indicate that the acid fluid was able to completely wormhole through the core in the reported time. This means that the fluid loss additives had little effect on the leak-off rate. "Spurt volume" is a measure of the ability of the fluid loss additive to establish leak-off control. Low values indicate good ple number 14, which contained more silica flour than sample 5 gave far superior results. The best performance was obtained with sample number 19–21. Sample 21 (plotted in the drawing) was the same as sample number 14 except an emulsion pad was used instead of a brine pad.

TABLE I

Viscous Acid Fluid Loss Experimental Data

| Sample No. | Pad Fluid | Acid Type | Polymer Type | Polymer Concentration (lb/bbl Acid) | Solids Concentration (lb/1000 gal) | Pressure Gradient (psi/inch) | Core Permeability brine (md) | Breakthrough Time (min) | Spurt Volume | $\mu(L/K)$ |
|---|---|---|---|---|---|---|---|---|---|---|
| 1 | Brine | Acid Emulsion | PVA | 3½ | — | 37 | 3.1 | 34.0 | | 0.44 |
| 2 | Brine | Acid Emulsion | PVA | 3½ | 200 Adomite Aqua | 37 | 1.2 | | 0.041 | 11.00 |
| 3 | Brine | Acid Emulsion | PVA | 3½ | 100 Adomite Aqua | 37 | 10.0 | 17.0 | 0.549 | 0.16 |
| 4 | Brine | Acid Emulsion | PVA | 3½ | 200 Adomite Aqua | 37 | 13.6 | | 0.155 | 7.63 |
| 5 | Brine | Acid Emulsion | PVA | 3½ | 200 Adomite Aqua | 37 | 38.0 | | 0.055 | 7.03 |
| 6 | Brine | Acid Emulsion | PVA | 3½ | 200 Adomite Aqua | 37 | 0.8 | | 0.028 | 2.93 |
| 7 | Brine | Acid Emulsion | PVA | 3½ | 200 Adomite Aqua | 91 | 0.8 | | | 1.15 |
| 8 | Brine | Acid Emulsion | PVA | 3½ | 200 Adomite Aqua | 173 | 0.8 | | | 1.59 |
| 9 | Brine | Acid Emulsion | PVA | 3½ | — | 37 | 1.2 | 3.0 | | 0.21 |
| 10 | Brine | Acid Emulsion | PVA | 3½ | — | 37 | 47.0 | 0.5 | | |
| 11 | Brine | Acid Emulsion | Guar | 2 | 200 Adomite Aqua | 86 | 1.8 | | 0.020 | 1.05 |
| 12 | Brine | Acid Emulsion | PVA-Guar | 3½ - 2 | — | 37 | 15.5 | | 0.084 | 5.30 |
| 13 | Brine | Acid Emulsion | PVA-Guar | 3½ - 2 | 50 Silica Flour | 37 | 60.4 | | 0.065 | 10.20 |
| 14 | Brine | Acid Emulsion | PVA-Guar | 3½ - 2 | 200 Silica Flour | 37 | 52.5 | | 0.020 | 13.18 |
| 15 | Brine | Acid Emulsion | PVA | 7 | 50 Silica Flour | 37 | 41.0 | | 0.040 | 35.15 |
| 16 | Brine | Acid Emulsion | PVA-Guar | 3½ - 2 | 200 Silica Flour | 339 | 29.0 | 0.7 | 0.016 | 0.40 |
| 17 | Emulsion | Acid Emulsion | PVA-Guar | 3½ - 2 | — | 339 | 44.0 | 0.07 | | |
| 18 | Emulsion | Acid Emulsion | PVA-Guar | 3½ - 2 | 40 Silica Flour | 339 | 20.0 | 0.25 | | |
| 19 | Emulsion | Acid Emulsion | PVA-Guar | 3½ - 2 | 100 Silica Flour | 339 | 32.6 | | 0.018 | 25.47 |
| 20 | Emulsion | Acid Emulsion | PVA-Guar | 3½ - 2 | 200 Silica Flour | 339 | 22.0 | | 0.014 | 25.11 |
| 21 | Emulsion | Acid Emulsion | PVA-Guar | 3½ - 2 | 200 Silica Flour | 339 | 15.5 | | 0.011 | 19.97 |
| 22 | Brine | Acid Emulsion | PVP-Guar | 3½ - 2 | 200 Silica Flour | 167 | 11.0 | | 0.020 | 16.8 |
| 23 | Brine | Acid Emulsion | PVA-Karaya | 3½ - 2 | 200 Silica Flour | 167 | 16.7 | | 0.030 | 9.7 | performance. The $\mu(L/K)$ values measure the steady state quality of the filter cake provided by the fluid loss composition. High $\mu(L/K)$ values mean low leak-off rate.

It should be observed that the values of each of the fluid loss characteristics [e.g. breakthrough, spurt volume, and $\mu(L/K)$] are strongly effected by the differential pressure, core permeability, and length of the cores used in each test.

Using the three characteristics noted above, the performance of the various fluid samples can be evaluated.

The systems without guar or solids (samples 1, 9, 10, 12, and 17) had poor fluid loss characteristics. All of the samples except sample number 12 broke through the core before the test was completed. Sample number 12 did not break through but this sample had a relatively high spurt volume and low $\mu(L/K)$ value when compared with samples 13 and 14.

The sample without PVA (sample 11) had a low $\mu(L/K)$ value.

Table I results also clearly show that the guar gum should be present in relatively high concentrations to provide better fluid loss control. One hundred pounds of Adomite Aqua per 1000 gallons of acid emulsion provide about 1½ pound per barrel of acid phase. The data shows that improved results are obtained with 2 pounds of guar per barrel of acid phase.

The data also shows that fluid loss of a fluid is effected by the pad fluid. Best results were obtained using an oil-in-water emulsion pad and at least 100 pounds of silica flour (see samples 19, 20, and 21).

The plot shown in the drawing compares typical systems tested. Sample number 1, which contains only PVA exhibited very poor fluid loss control. Sample number 5 which contained the three component fluid loss additives performed satisfactorily. However, sam- Tests on sample 22 indicate that PVP may be substituted for PVA in the three component composition with comparable results. Other gums in lieu of guar may also be used. (See the results of the test on sample 23 containing PVA-Karaya and Silica Sand.)

FIELD TESTS

The following filed tests illustrate specific procedures for carrying out the method of the present invention. The three component fluid loss additive used in the first test was PVA, and Adomite Aqua (guar and silica sand and clay mixture). The second test employed the three components as separate additives.

A producing well completed in four intervals between about 15,000 to about 16,000 feet was converted to a water injection well. In order to increase water injectivity, the well was acid fractured by the method of the present invention. The subsurface temperature of the formation was about 285°F. In order to insure that each of the producing zones was fractured, the acid fracturing treatment was performed in four separate stages. Each stage consisted of the sequential injection of (a) acid external emulsion; (b) aqueous solution of 15% HCl (ungelled); (c) a fresh water; and (d) diverting fluid.

The emulsion was prepared by adding 1% by volume of a commercial oil-in-water emulsifier (sold as Corexit 8596 by Exxon Chemical Company) to 28% HCl solution and blending field crude oil into the acid solution at a volume ratio of two parts oil per part acid solution. A commercial corrosion inhibitor was also used in the emulsion. The blending operations were performed on the run during which the polyvinyl alcohol (sold as Elvanol 522-22) in a concentration of 3.5 pounds per barrel of acid phase and Adomite Aqua in a concentration of 200 pounds per 1000 gallons were added to the emulsion.

The gelled water was prepared by adding guar gum and a commercial fluid loss additive to brine at a concentration of about 12 pounds per barrel and 9 pounds per barrel of fluid respectively.

Following pressure testing of the equipment and injection of about 100 barrels of fresh water, the pumping schedule was as follows:

| | |
|---|---|
| First Stage: | 150 barrels of acid external emulsion |
| | 150 barrels of 15% HCl |
| | 100 barrels of fresh water |
| | 12 barrels of diverting fluid |
| Second Stage: | 150 barrels of acid external emulsion |
| | 150 Barrels of 15% HCl |
| | 100 barrels of fresh water |
| | 24 barrels of diverting fluid |
| Third Stage: | 150 barrels of acid external emulsion |
| | 150 barrels of 15% HCl |
| | 100 barrels of fresh water |
| | 36 barrels of diverting fluid |
| Fourth Stage: | 150 barrels of acid external emulsion |
| | 150 barrels of 15% HCl |
| | 100 barrels of fresh water |

Fluid in the casing was then displaced with crude oil.

Following the treatment, the well was put on water injection. The 30-day stabilized injection rate was 12,300 B/D at 1700 psi surface pressure compared to a calculated injectivity of 7000 B/D at 3000 psi without stimulation.

A second field test was performed on a gas well producing from limestone formations between about 8300 and 8900 feet.

Prior to commencing pumping operations 6300 gallons of an acid external emulsion was prepared. The emulsifier and corrosion inhibitor were added to 2100 gallons of 28% HCl. Two hundred pounds of PVA (Elvanol 522-22) was then added to the acid solution and permitted to hydrolyze for one hour. Forty-two hundred gallons of lease condensate was then blended into the acid solution using an oil field blender forming an emulsion comprising two parts oil (internal phase) per part of acid (external phase).

Following pressure testing of equipment, pumping operations were commenced. Guar gum and silica flour were blended into the acid external emulsion at concentrations of 1 pound per barrel of acid solution and 8.5 pounds per barrel of fluid, respectively.

The pumping schedule was as follows:

| | |
|---|---|
| First Stage: | 75 barrels of acid external emulsion |
| | 48 barrels of 15% HCL acid containing 125 pounds of guar gum |
| | 2 barrels of acid emulsion containing commercial diverting agent |
| Second Stage: | 75 barrels of acid external emulsion |
| | 50 barrels of 15% HCl acid solution containing 125 pounds of guar gum |

Fluid in the casing was displaced with field salt water containing a commercial corrosion inhibitor, and the well was shut in.

Although the present invention has been described with particular reference to emulsion acid systems, it will be appreciated by those skilled in the art that the three component system, e.g. vinylpolymer, natural gum, and finely divided particles, may be employed to improve the fluid loss characteristics of other acid systems, thereby achieve deeper acid penetration than otherwise possible.

We claim:

1. A method of fracturing a subterranean formation which comprises injecting into said formation at a pressure sufficient to form a fracture therein an acid emulsion comprising a major volume proportion of a hydrocarbon liquid as the internal phase and a minor volume proportion of an aqueous acid solution as the external phase, said acid emulsion containing an effective amount of a fluid loss additive comprising finely divided particulate material present in a concentration of at least 2 pounds per barrel of said emulsion; and from about 1 to about 5 weight percent in said acid solution of a polymer mixture of (a) a vinyl polymer for increasing the viscosity of said aqueous acid solution and selected from the group consisting of polyvinyl alcohol, polyvinyl pyrrolidone, and copolymers of vinyl alcohol and vinyl pyrrolidone, and (b) a water-soluble natural gum, said natural gum constituting at least 25 weight percent of said polymer mixture.

2. A method as defined in claim 1 wherein said particulate material is silica sand having an average particle size smaller than 74 microns and is present in said acid emulsion in a concentration between about 2 and 10 pounds per barrel.

3. A method as defined in claim 2 wherein the acid solution is HCl, the vinyl polymer is selected from the group consisting of polyvinyl alcohol and polyvinylpyrrolidone, and the natural gum is selected from the group consisting of guar and karaya.

4. A method as defined in claim 1 wherein the concentration of vinyl polymer in the acid solution is between 0.75 and 3.0 weight percent, and the concentration of the natural gum in the acid solution is between about 0.25 and 1.0 weight percent.

5. A method as defined in claim 4 wherein the weight ratio of said vinyl polymer and said natural gum ranges from about 3:1 to about 1:1.

6. A method as defined in claim 1 wherein the internal oil phase of the emulsion comprises no more than 80 volume percent of the emulsion.

7. A method as defined in claim 6 wherein a fracturing fluid is injected into said formation ahead of said acid emulsion to form a fracture therein, said fracturing fluid having a viscosity substantially greater than the acid solution.

8. A method as defined in claim 1 wherein said vinyl polymer is selected from the group consisting of polyvinyl alcohol and polyvinylpyrrolidone and said natural gum is selected from the group consisting of guar and karaya.

9. A method as defined in claim 1 wherein the finely divided particulate material is silica sand, having an average particle size smaller than about 74 microns.

10. A method of fracturing a subterranean formation containing calcareous constituents which comprises injecting into said formation at a pressure sufficient to form a fracture therein an emulsion comprising from about 50 to about 80 volume percent of a hydrocarbon liquid as the internal phase and from about 20 to 50 volume percent of an aqueous liquid as the external phase, said aqueous liquid containing a polymeric thickening agent; and thereafter injecting into said formation an acid emulsion comprising from about 50 to about 80 volume percent of a hydrocarbon liquid as the internal phase and from about 20 to about 50 volume percent of an aqueous acid solution having dispersed therein a fluid loss additive comprising (a) finely divided particulate material present in a concentration of at least 2 pounds per barrel of said acid emulsion, and (b) a water-soluble polymer mixture including a water-soluble natural gum, and a vinyl polymer selected from the group consisting of polyvinyl alcohol, polyvinyl pyrrolidone, and copolymers of vinyl alcohol and vinyl pyrrolidone, the concentration of the vinyl polymer being sufficient to substantially increase the viscosity of the acid solution, and the concentration of the polymer mixture in the aqueous acid solution being at least one weight percent and said natural gum comprises at least 25 weight percent of said polymer mixture.

11. A method as defined in claim 10 wherein the concentration of said vinyl polymer and said natural gum in said aqueous acid solution is at least 0.75 and 0.25 weight percent respectively.

\* \* \* \* \*